United States Patent
Caronni et al.

(10) Patent No.: US 7,685,312 B1
(45) Date of Patent: Mar. 23, 2010

(54) RESOURCE LOCATION BY ADDRESS SPACE ALLOCATION

(75) Inventors: Germano Caronni, Menlo Park, CA (US); Raphael J. Rom, Palo Alto, CA (US); Glenn Carter Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1058 days.

(21) Appl. No.: 11/055,727

(22) Filed: Feb. 10, 2005

(51) Int. Cl.
*G06F 15/16* (2006.01)

(52) U.S. Cl. .................. 709/245; 709/203; 709/214; 709/215; 709/219; 709/238; 709/241; 709/244; 709/248

(58) Field of Classification Search ........... 709/203, 709/219, 238, 245, 248, 241, 242, 244, 214, 709/215, 224
See application file for complete search history.

(56) References Cited

U.S. PATENT DOCUMENTS

| | | | | |
|---|---|---|---|---|
| 5,396,614 A * | 3/1995 | Khalidi et al. | ............... | 711/118 |
| 5,829,041 A * | 10/1998 | Okamoto et al. | ............ | 711/147 |
| 6,016,529 A * | 1/2000 | Woodman | ....................... | 711/3 |
| 6,138,162 A * | 10/2000 | Pistriotto et al. | ............ | 709/229 |
| 6,173,311 B1 * | 1/2001 | Hassett et al. | ................ | 709/202 |
| 6,578,066 B1 * | 6/2003 | Logan et al. | ................. | 718/105 |
| 6,760,775 B1 * | 7/2004 | Anerousis et al. | ........... | 709/238 |
| 6,959,333 B2 * | 10/2005 | Beaumont et al. | ........... | 709/223 |
| 7,028,083 B2 * | 4/2006 | Levine et al. | ................ | 709/223 |
| 7,111,061 B2 * | 9/2006 | Leighton et al. | ............ | 709/224 |
| 7,152,099 B1 * | 12/2006 | Arens | .......................... | 709/220 |
| 7,251,688 B2 * | 7/2007 | Leighton et al. | ............ | 709/224 |
| 7,293,154 B1 * | 11/2007 | Karr et al. | .................... | 711/202 |
| 7,308,505 B2 * | 12/2007 | Herring et al. | .............. | 709/238 |
| 7,441,096 B2 * | 10/2008 | Kitamura | ..................... | 711/203 |
| 2002/0042823 A1 * | 4/2002 | DeBettencourt et al. | .... | 709/224 |
| 2002/0087707 A1 * | 7/2002 | Stewart et al. | .............. | 709/230 |
| 2003/0110305 A1 * | 6/2003 | Saxena | ........................ | 709/251 |
| 2005/0021817 A1 * | 1/2005 | Shimizu et al. | ............. | 709/231 |

OTHER PUBLICATIONS

A. Adya, et al.; "Farsite: Federated, Available, and Reliable Storage for an Incompletely Trusted Environment"; Proceedings of the 5$^{th}$ Symposium on Operating Systems and Design Implementation OSDI; Dec. 2002 (14 pages).

I. Clarke, et al.; "Freenet: A Distributed Anonymous Information Storage and Retrieval System"; Lecture Notes in Computer Science; 2000 (21 pages).

J. Kubiatowicz, et al.; "OceanStore: An Architecture for Global-Scale Persistent Storage"; Proceedings of ACM ASPLOS; Nov. 2000 (12 pages).

(Continued)

*Primary Examiner*—Michael Won
(74) *Attorney, Agent, or Firm*—Osha • Liang LLP

(57) ABSTRACT

A method for locating a free resource involves maintaining an address space containing a plurality of regions, wherein each of the plurality of regions is mapped with a server to obtain a mapping, transmitting a request for the free resource from a client to a request address that belongs to one of the plurality of regions, determining a selected server using the mapping, and directing the request for the free resource to the selected server.

16 Claims, 4 Drawing Sheets

OTHER PUBLICATIONS

A. Rowstron, et al.; "Storage Management and Caching in PAST, a Large-Scale, Peristent Peer-to-Peer Storage Utility"; Symposium on Operating Systems Principles; Oct. 2001 (13 pages).

S. Quinlan, et al.; "Venti: A New Approach to Archival Storage"; Proceedings of the FAST 2002 Conference on File and Storage Technologies; First USENIX Conference on File and Storage Technologies; Jan. 2002 (14 pages).

A. Muthitacharoen, et al.; "Ivy: a Read/Write Peer-to-Peer File System"; Proceedings of the 5th USENIX Symposium on Operating Systems Design and Implementation (OSDI '02); Dec. 2002 (23 pages).

F. Dabek, et al.; "Towards a Common API for Structured Peer-to-Peer Overlays"; Proceedings of 2nd International Workshop on Peer-to-Peer Systems (IPTPS '03), Feb. 2003 (11 pages).

I. Stoica, et al.; "Chord: A Scalable Peer-to-Peer Lookup Service for Internet Applications"; Proceedings of the SIGCOMM 2001 Conference on Applications, Technologies, Architectures, and Protocols for Computer Communications; Aug. 2001 (12 pages).

B. Zhao, et al.; "Tapestry: A Resilient Global-Scale Overlay for Service Deployment"; IEEE Journal on Selected Areas in Communications; Jan. 2004 (15 pages).

A. Rowstron, et al.; "Pastry: Scalable, Decentralized Object Location and Routing for Large-Scale Peer-to-Peer Systems"; Lecture Notes in Computer Science; 2001 (22 pages).

C. Greg Plaxton, et al.; "Accessing Nearby Copies of Replicated Objects in a Distributed Environment"; ACM Symposium on Parallel Algorithms and Architectures; Jun. 1997 (23 pages).

M. Castro, et al.; "Practical Byzantine Fault Tolerance"; Symposium on Operating Systems Design and Implementation; Feb. 1999 (14 pages).

D. B. Terry, et al.; "Managing Update Conflicts in Bayou, a Weakly Connected Replicated Storage System"; Proceedings of the Fifteenth ACM Symposium on Operating Systems Principles; Dec. 1995 (12 pages).

D. Boneh, et al.; "Efficient Generation of Shared RSA Keys"; Journal of the ACM; 2001 (21 pages).

Y. Frankel, et al.; "Robust Efficient Distributed RSA-Key Generation"; Proc. 30th Annual ACM Symposium on Theory of Computing (STOC); May 1998 (10 pages).

* cited by examiner

RESOURCE LOCATION BY ADDRESS SPACE ALLOCATION

BACKGROUND

Typical operating systems (e.g., windows-based systems by Microsoft, Sun Solaris™, Linux™, MacOS by Apple Computer, Unix, etc.) provide a resource manager. The resource manager shares the resources of a computer system with the applications requesting use of the resources. Typical resources that are managed by a resource manager include processors, disk space, memory, peripheral devices, etc. For example, if two applications request to use the printer, the resource manager determines which application uses the printer first by placing requests into a queue. In this example, the applications and the printer may be local to one system, and the local printer may be the only printer available to the applications.

In a distributed system, computer systems may be located in multiple locations throughout a private or public network. The computer systems within a distributed system may be considered a client, a server, or act as a client and server in certain situations. The client is typically the computer system that requests a service or resource, while the server is a computer system that shares a resource or performs a service (hereinafter, the use of the term "resource" is intended to refer to resources or services). A distributed system is useful because the distributed system allows the load created from the client requests to be distributed among a number of servers. The distributed system allows a client request to be handled by one of the number of servers.

Several methods are currently used to provide the location of a server where the requested resource may be found. These methods include using directory services, advertising (e.g., broadcasting), and querying (e.g., unicast, multicast, etc.). The current methods may provide a one-to-one mapping of a client and a server that handles the request of the client. With this method, several servers may be available to satisfy requests, but individual clients are mapped directly to specific servers. Another method, for example, may send a request out to the network, where servers that are listening for requests respond.

As discussed above, the server may handle a client's request for a resource using a one-to-one mapping. For example, a client, Client X, may have an object, Object A, that needs to be stored. Client X may be mapped, using a one-to-one mapping, with Server Z. In this distributed system, Client X may send a request to Server Z to store Object A. Several possibilities may occur. Server Z may reply indicating that space is available and Object A may be stored on Server Z. Server Z may reply indicating that space is not available, and Object A cannot be stored on Server Z. Server Z may reply indicating that the Server Z is busy, and the request is handled later. Server Z may not reply. In this type of system, the server typically is prepared for the specific types of requests that a client may make, and has a large amount of resource available.

SUMMARY

In general, in one aspect, the invention relates to a method for locating a free resource comprising maintaining an address space containing a plurality of regions, wherein each of the plurality of regions is mapped with a server to obtain a mapping, transmitting a request for the free resource from a client to a request address that belongs to one of the plurality of regions, determining a selected server using the mapping, and directing the request for the free resource to the selected server.

In general, in one aspect, the invention relates to a system for locating a free resource comprising an address space comprising a plurality of regions, wherein each of the plurality of regions is mapped with a server to obtain a mapping, a client configured to transmit a request for the free resource to a request address, wherein the request address is within one of the plurality of regions, and a selected server determined using the mapping, wherein the request is directed from the address space to the selected server.

In general, in one aspect, the invention relates to a computer readable medium comprising software instructions for locating a free resource, wherein the software instructions comprise functionality to maintain an address space containing a plurality of regions, wherein each of the plurality of regions is mapped with a server to obtain a mapping, transmit a request for the free resource from a client to a request address that belongs to one of the plurality of regions, determine a selected server using the mapping, and direct the request for the free resource to the selected server.

In general, in one aspect, the invention relates to a plurality of nodes, comprising an address space comprising a plurality of regions, wherein each of the plurality of regions is mapped with a server to obtain a mapping, a client configured to transmit a request for the free resource to a request address, wherein the request address is within one of the plurality of regions, and a selected server determined using the mapping, wherein the request is directed from the address space to the selected server, wherein the address space is located on at least one of the plurality of nodes, wherein the client is located on at least one of the plurality of nodes, wherein the free resource is located on at least one of the plurality of nodes, wherein the selected server is located on at least one of the plurality of nodes.

Other aspects and advantages of the invention will be apparent from the following description and the appended claims.

DETAILED DESCRIPTION

Figure 1:
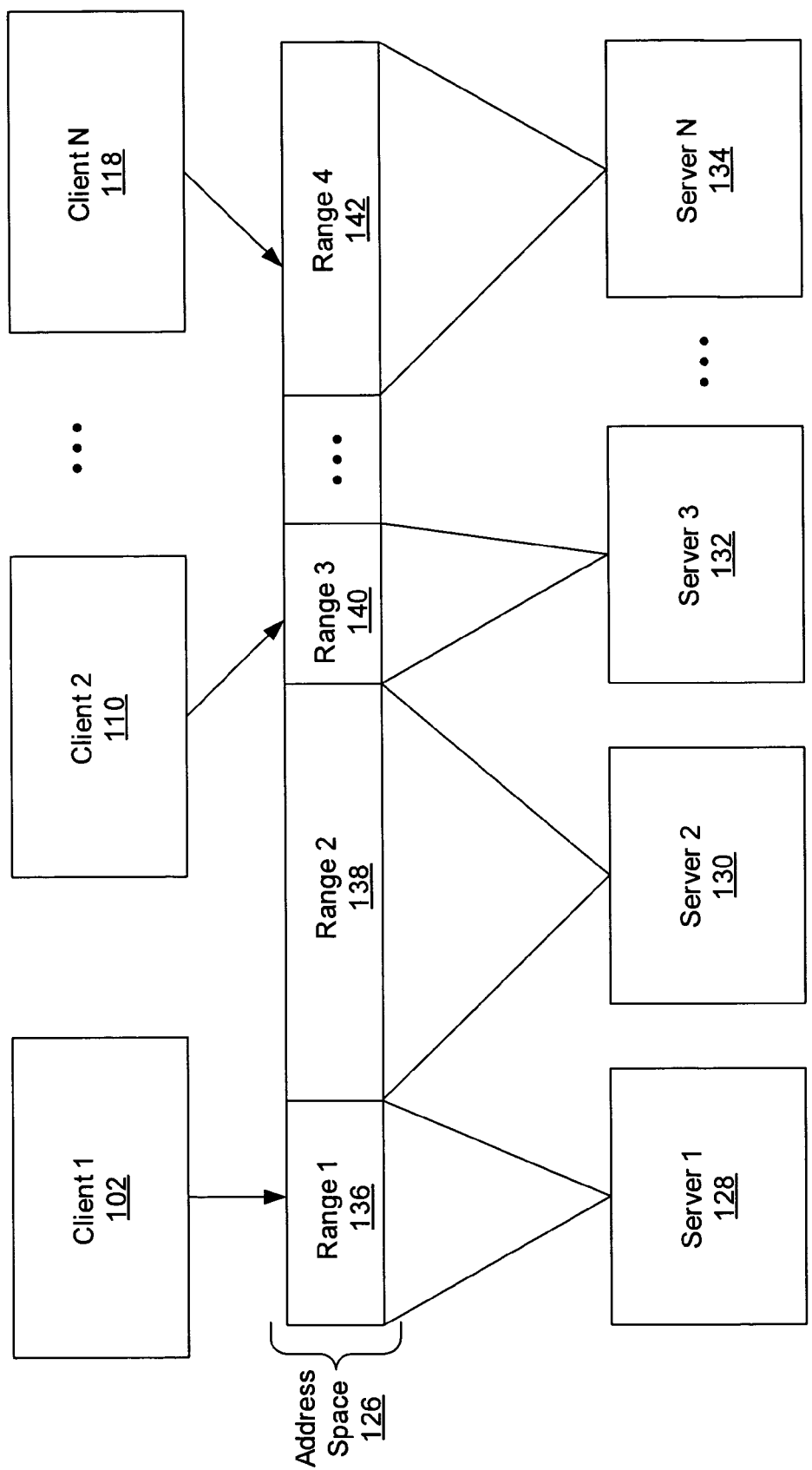
FIG. 1 shows a system for locating a resource, in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of this invention provide a system and method for locating a resource by using address space allocation. Specifically, in one embodiment of the invention, a request for a resource is made by a client using an address belonging to a mapped address space. More specifically, in one embodiment of the invention, a number of servers are mapped to specific ranges in the address space, and any request to an address in that range is directed to the server mapped to that range. Accordingly, the server and the client establish a direct connection and the server services the request received from the client.

In a distributed system, a distributed hash table (DHT) may be used to store and locate data throughout a number of servers. No central server is required to locate the data, instead each server has a partial list that may be used to determine where the data is located in a short series of steps. DHT allows the use of a programming interface with services that may be used to store data, distribute data, etc. DHT provides an algorithm to locate data once it is stored in one of the number of servers. DHT treats each server like a bucket in a hash table, and assigns the responsibility of data to a server using a hash function allowing easy lookup when the data is needed.

FIG. 1 shows the system for locating a resource, in accordance with one embodiment of the invention. FIG. 1 shows several clients (e.g., Client 1 (102), Client 2 (104), and Client N (106)) which have functionality to send requests to a particular address in an Address Space (126). Though not shown in FIG. 1, each of client may include an operating system and applications that execute on top of the operating system. The application may be any user program or system program (e.g., a word processor, a spread sheet application, a garbage collector, etc.) The operating system may be any program that allocates resources, including disk space, processor time, a printer, device drivers, libraries, software components, etc. In accordance with one embodiment of the invention, the applications or operating system may generate the requests to be serviced.

In accordance with one embodiment of the invention, the resource may be storage space, processor time, a printer, etc.

In accordance with one embodiment, the Address Space (126) is mapped to one or more servers (e.g., Server 1 (128), Server 2 (130), Server 3 (132), and Server N (134)). Specifically, each server is mapped to a specific range in the address space (e.g., Range 1 (136), Range 2 (138), Range 3 (140), Range N (142)). In one embodiment of the invention, the size of the range mapped to a particular server is proportional to the amount of free resource a server has available. Further, a client and server include functionality to open a connection and directly communicate with each other, allowing a server to service the request of a client.

Figure 2:
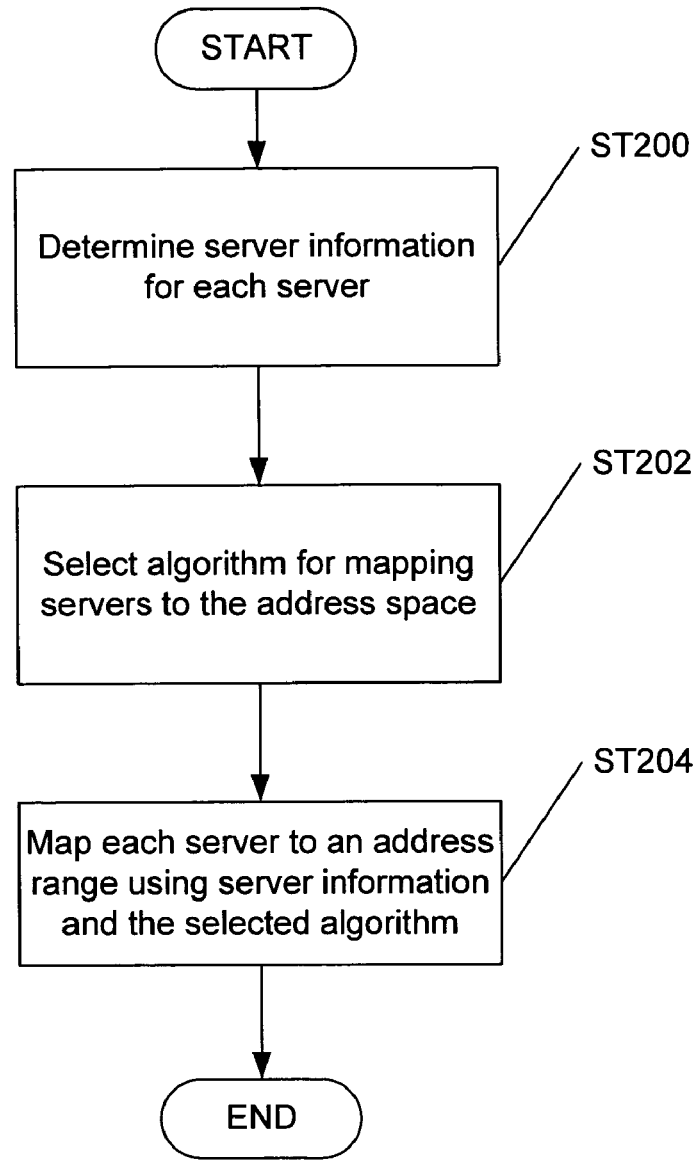
FIG. 2 shows a flow chart for initializing a system to locate a resource, in accordance with one embodiment of the invention.

FIG. 2 shows a flow chart for initializing a system to locate a resource, in accordance with one embodiment of the invention. In accordance with one embodiment of the invention, server information (e.g., capacity, reliability, availability, bandwidth, etc.) is obtained about each server (ST200). Specifically, the server information corresponds to the amount of available resource on a given server.

Next, an algorithm that determines how to map the servers to the address space is selected (ST202). In one embodiment of the invention, the algorithm may divide the address space into ranges proportional to the amount of free resources available to each server. In accordance with one embodiment of the invention, the selected algorithm may use DHT. Specifically, a server may communicate with each of its two neighbors (e.g., a DHT neighbor, such as a lower neighbor and a higher neighbor). The server determines the boundary for its range in the address space by comparing the server information with each neighbor. In one embodiment of the invention, the address space is divided linearly, and the size of each range is proportionate to the server information for the server mapped to the range.

Once the algorithm is set, each server is mapped to a specific range in the address space using the algorithm based on the server information (ST204). In one embodiment of the invention, as shown in FIG. 1, the size of the range mapped to each server may differ for each server. In one embodiment of the invention, the ranges of two servers may overlap.

Figure 3:
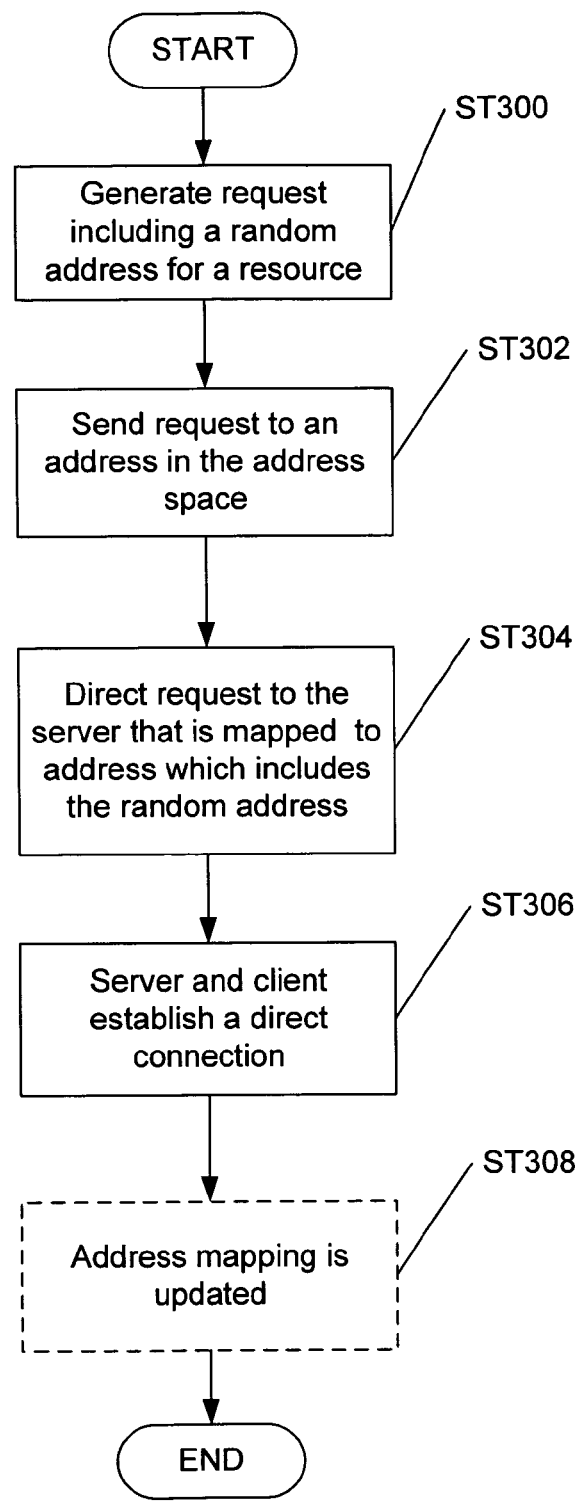
FIG. 3 shows a flow chart for locating a resource, in accordance with one embodiment of the invention.

FIG. 3 shows a flow chart for locating a resource, in accordance with one embodiment of the invention. Initially, the client generates a request for a resource (ST300). Next, the request is sent to an address in the address space that is mapped with servers (ST302). In one embodiment of the invention, the client randomly selects an address belonging to the address space that is mapped with the servers. The randomly selected address is located within a specific range in the address space.

Next, the request is directed to the server that is mapped to the address which is within the address range (ST304). Each range is mapped directly to a server that is constantly monitoring the requests that are sent to that range. In one embodiment of the invention, the ranges may overlap. If a request is sent to an address belonging to an overlapped range, the servers monitoring that space may communicate to determine which server should service the request, or a random choice is made to choose the server.

In accordance with one embodiment of the invention, for example, when a request is made, the request is routed to the nearest server which acts as the root. The root checks whether the address to which the request was sent is within its range. If the address is not within the range, the request is transferred to the neighbor server, otherwise the request is serviced by the current server. In accordance with another embodiment of the invention, the servers may be arranged hierarchically as opposed to linearly. Therefore, if the address is not within the range, the request may be transferred to another server based on the hierarchy. One skilled in the art would appreciate that in one embodiment of the invention, an overlay network may be built allowing a server to change locations and not be bound to an actual server address.

In one embodiment of the invention, if the server is not available or does not have the resource available, the client may generate a new request (not shown in FIG. 3). If the server does have the resource available, the server may generate a connection with the client so the server and client can communicate directly (ST306). During the direct connection, the server may service the request made by the client.

In one embodiment of the invention, after the request is serviced, the server may have less resource available, and the range to which the server is mapped may be updated based on the selected algorithm (ST308). For example, after the server services the client's request to store 100 bytes of data, the server has 100 bytes less of storage space available. Similarly, in one embodiment of the invention, during the servicing of the request, the server may have less resources available, and the range to which the server is mapped may be updated based on the selected algorithm (ST308). For example, if the clients request is to use a printer, while the server is servicing the request, then one less printer is available to the server. Updating the address space after each request is serviced may be inefficient. In accordance with one embodiment of the invention, an overlay network may be used to forward a request to another server if a request is sent to a server with a disproportionate address range size.

In one embodiment of the invention, the capacity of the whole system may be derived with the use of an arbitrary algorithm. The capacity is known to each server, thus, each server knows how much capacity is available. In accordance with one embodiment of the invention, the address ranges may be distributed in a chord organization where the servers are aligned in a ring and each server has two neighbors. One at a time, each server obtains an address range, and each server tells its right hand neighbor its ending address. In one embodiment of the invention, a random request is handed around the ring in a chord-optimized manner until the appropriate server is reached. If that server does not have enough space, the request may either be given to a neighbor or the process may restart. In one embodiment of the invention, the servers may be arranged in a tapestry organization. In the tapestry organization, each server allocates a random address range according to its resource percentage, and publishes the range. The server responsible for servicing requests is the server closest to the middle of the range.

The following is an example of using an address space to locate a server to service a client's request. Client X has an object, Object A, that needs to be stored on a storage server. The size of the Object A is 100 bytes. Client X generates a request to store Object A. Specifically, Client X generates a request for 100 bytes of storage space.

In this example, the address space is 8-bits, providing 256 unique addresses. In this distributed system, three storage servers are available, Storage Server X, Storage Server Y, and Storage Server Z. Storage Server X has 100 bytes of free space, Storage Server Y has 200 bytes of free space, and Storage Server Z has 50 bytes of free space.

Further, the chosen algorithm for mapping servers to the address space divides the address space into ranges proportional to the storage capacity of each server. Specifically, the address space is divided into three ranges, namely Range 1, Range 2, and Range 3. Range 1 covers addresses 0 to 73 and is mapped to Storage Server X. Range 2 covers addresses 74 to 220 and is mapped to Storage Server Y. Range 3 covers addresses 221 to 255 and is mapped to Storage Server Z. As noted above, the size of each range is proportional to the amount of free space for the server mapped to that range.

In an embodiment of the invention, Client X sends the request to a random address belonging to the address space. Specifically, Client X sends the request to Address 200. Address 200 belongs to Range 2, which is mapped to Storage Server Y. The request is sent to Storage Server X, however Storage Server X is only mapped to addresses 0 to 73. Therefore, Storage Server X transfers the request to its neighbor, Storage Server Y. Storage Server Y monitors all requests that are directed to Range 2, namely addresses 74 to 220. Storage Server Y accepts the request sent from Client X to Address 200 and Storage Server Y determines that enough space is available to store Object A.

After Storage Server Y determines that enough space is available to store Object A, Storage Server Y opens a connection with Client X, so that Storage Server Y and Client X may communicate directly. Once the connection is open, Client X may transfer Object A to Storage Server Y, and, in turn, Storage Server Y services the request of Client X by storing Object A.

Once Object A is stored on Storage Server Y, Storage Server Y has 100 less bytes of storage space. The address space now may be adjusted so the sizes of each range are proportional to the updated storage capacity of each server. The chosen algorithm divides the address space into ranges proportional to the storage capacity of each server. Range 1 covers addresses 0 to 102 and is mapped to Storage Server X. Range 2 covers addresses 103 to 205 and is mapped to Storage Server Y. Range 3 covers addresses 206 to 255 and is mapped to Storage Server Z. As noted above, the size of each range is proportional to the amount of free space for the server mapped to that range.

Figure 4:
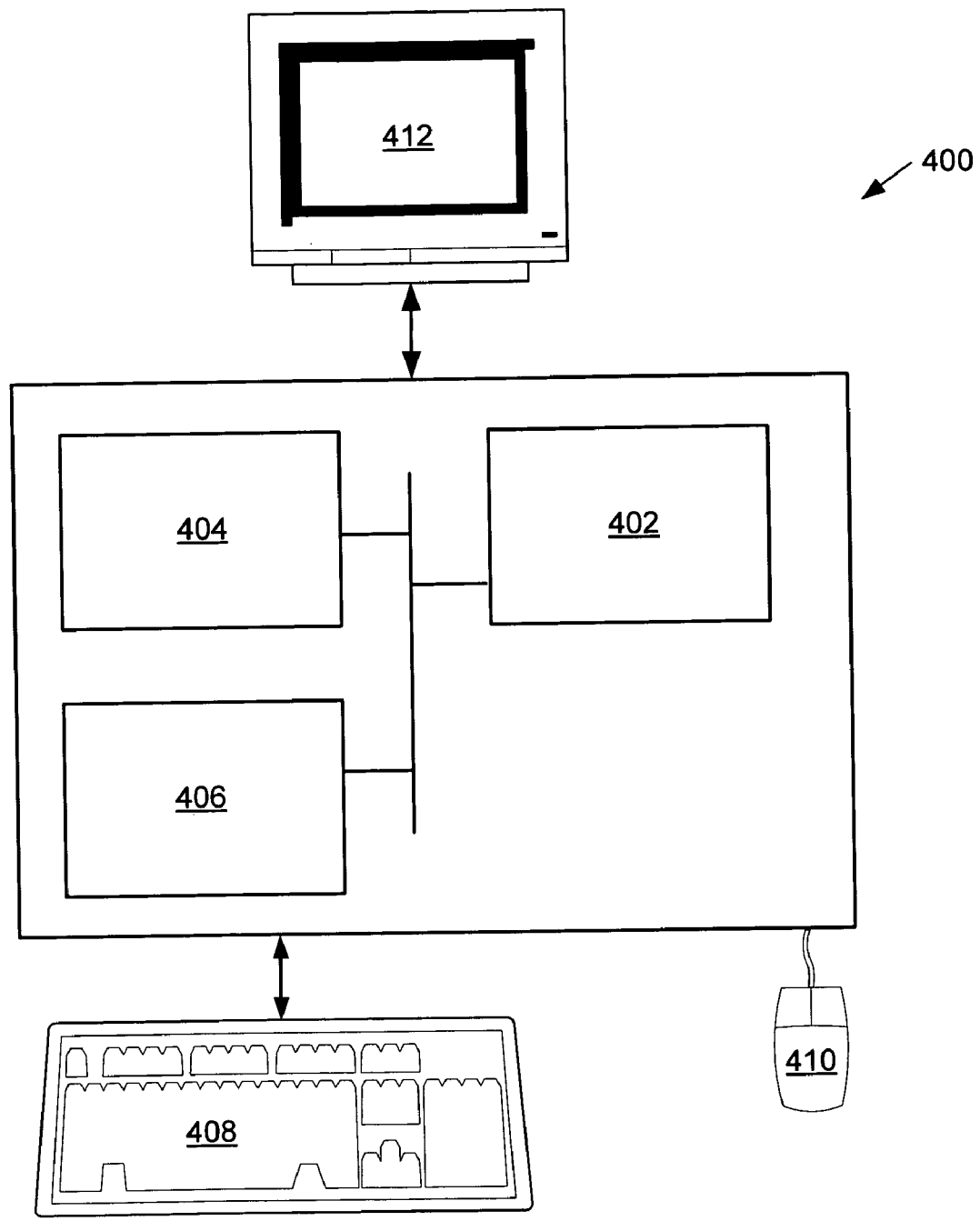
FIG. 4 shows a typical computer system, in accordance with one embodiment of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer system (400) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for locating a free resource comprising:

maintaining an address space containing a plurality of ranges of addresses;

determining free resources available to each server of a plurality of servers;

dividing the address space into the plurality of ranges of addresses proportional to the free resources available to each server;

obtaining a mapping between the plurality of servers and the plurality of ranges of addresses;

transmitting a request for the free resource from a client to a randomly-selected address in a range of the plurality of ranges of addresses, wherein the request from the client identifies the randomly-selected address, and wherein the client randomly selects the randomly-selected address from the address space;

identifying a server of the plurality of servers to obtain a selected server, wherein the server is identified based on the mapping to the range of the plurality of ranges of addresses comprising the randomly-selected address, and wherein a second range of the plurality of ranges of addresses overlaps the range comprising the randomly-selected address; and directing the request for the free resource to the selected server.

2. The method of claim 1, further comprising:

servicing the request by placing the selected server and the client in direct communication.

3. The method of claim 1, wherein a size of each of the plurality of ranges of addresses is determined by at least one from the group consisting of a capacity of the server mapped with each of the plurality of ranges of addresses, a reliability of the server mapped with each of the plurality of ranges of addresses, and an availability of the server mapped with each of the plurality of ranges of addresses.

4. The method of claim 3, wherein the size of each of the plurality of ranges of addresses is updated periodically.

5. The method of claim 1, wherein the free resource is storage space.

6. A system for locating a free resource comprising:
an address space comprising a plurality of ranges of addresses;
a distributed hash table (DHT) configured to:
  determine free resources available to each server of a plurality of servers;
  divide the address space into the plurality of ranges of addresses proportional to the free resources available to each server;
  obtain a mapping between the plurality of servers and the plurality of ranges of addresses;
a client configured to:
  transmit a request for the free resource to a randomly-selected address, wherein the randomly-selected address is within a range of the plurality of ranges of addresses, wherein the request from the client identifies the randomly-selected address, and wherein the client randomly selects the randomly-selected address from the address space; and
a server of the plurality of servers, wherein the server is identified based on the mapping to the range of the plurality of ranges of addresses comprising the randomly-selected address to obtain a selected server,
wherein the request is directed from the address space to the selected server, and
wherein a second range of the plurality of ranges of addresses overlaps the range comprising the randomly-selected address.

7. The system of claim 6, wherein the request for the free resource is serviced by placing the selected server and the client in direct communication.

8. The system of claim 6, wherein a size of each of the plurality of ranges of addresses is determined by at least one from the group consisting of a capacity of the server mapped with each of the plurality of ranges of addresses, a reliability of the server mapped with each of the plurality of ranges of addresses and an availability of the server mapped with each of the plurality of ranges of addresses.

9. The system of claim 8, wherein the size of each of the plurality of ranges of addresses is updated periodically.

10. The system of claim 6, wherein the free resource is storage space.

11. A computer readable medium comprising software instructions for locating a free resource, wherein the software instructions comprise functionality to:
maintain an address space containing a plurality of ranges of addresses;
determine free resources available to each server of a plurality of servers;
divide the address space into the plurality of ranges of addresses proportional to the free resources available to each server;
obtain a mapping between the plurality of servers and the plurality of ranges of addresses;
transmit a request for the free resource from a client to a randomly-selected address in a range of the plurality of ranges of addresses, wherein the request from the client identifies the randomly-selected address, and wherein the client randomly selects the randomly-selected address from the address space;
identify a server of the plurality of servers to obtain a selected server, wherein the server is identified based on the mapping to the range of the plurality of ranges of addresses comprising the randomly-selected address, and wherein a second range of the plurality of ranges of addresses overlaps the range comprising the randomly-selected address; and
direct the request for the free resource to the selected server.

12. The computer readable medium of claim 11, further comprising:
software instructions with the functionality to service the request for the free resource by placing the selected server and the client in direct communication.

13. A plurality of nodes, comprising:
an address space comprising a plurality of ranges of addresses;
a distributed hash table (DHT) configured to:
  determine free resources available to each server of a plurality of servers;
  divide the address space into the plurality of ranges of addresses proportional to the free resources available to each server;
  obtain a mapping between the plurality of servers and the plurality of ranges of addresses;
a client configured to:
  transmit a request for the free resource to a randomly-selected address, wherein the randomly-selected address is within a range of the plurality of ranges of addresses, wherein the request from the client identifies the randomly-selected address, and wherein the client randomly selects the address from the address space; and
a server of the plurality of servers, wherein the server is identified based on the mapping to the range of the plurality of ranges of addresses comprising the randomly-selected address to obtain a selected server,
wherein the request is directed from the address space to the selected server,
wherein the address space is located on at least one of the plurality of nodes,
wherein the client is located on at least one of the plurality of nodes,
wherein the free resource is located on at least one of the plurality of nodes,
wherein the selected server is located on at least one of the plurality of nodes, and
wherein a second range of the plurality of ranges of addresses overlaps the range comprising the randomly-selected address.

14. The plurality of nodes of claim 13, wherein the request for the free resource is serviced by placing the selected server and the client in direct communication.

15. The method of claim 1, wherein the free resource is a hardware resource.

16. The system of claim 6, wherein the free resource is a hardware resource.

* * * * *